United States Patent
Hasegawa et al.

(10) Patent No.: US 11,427,449 B2
(45) Date of Patent: Aug. 30, 2022

(54) FORKLIFT APPARATUS, FORKLIFT CONTROL METHOD, AND NON-TRANSITORY COMPUTER-READABLE MEDIUM

(71) Applicant: MITSUBISHI HEAVY INDUSTRIES, LTD., Tokyo (JP)

(72) Inventors: Noriyuki Hasegawa, Tokyo (JP); Kensuke Futahashi, Tokyo (JP); Naoto Kawauchi, Tokyo (JP); Megumu Tsuruta, Tokyo (JP); Yusuke Kinouchi, Tokyo (JP); Yasuo Fujishima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 716 days.

(21) Appl. No.: 16/452,832

(22) Filed: Jun. 26, 2019

(65) Prior Publication Data
US 2020/0002143 A1 Jan. 2, 2020

(30) Foreign Application Priority Data
Jun. 29, 2018 (JP) ............................. JP2018-124449

(51) Int. Cl.
| B66F 9/075 | (2006.01) |
| B66F 9/06 | (2006.01) |
| G05D 1/02 | (2020.01) |
| B66F 17/00 | (2006.01) |

(52) U.S. Cl.
CPC .......... *B66F 9/07559* (2013.01); *B66F 9/063* (2013.01); *B66F 9/0755* (2013.01); *B66F 9/07568* (2013.01); *B66F 17/003* (2013.01); *G05D 1/021* (2013.01); *G05D 2201/0216* (2013.01)

(58) Field of Classification Search
CPC .... B66F 9/07559; B66F 9/063; B66F 9/0755; B66F 9/07568; B66F 17/003; G05D 1/021; G05D 2201/0216
See application file for complete search history.

(56) References Cited

U.S. PATENT DOCUMENTS

| 7,757,946 B2 | 7/2010 | Kienzle-Lietl |
| 2018/0105406 A1 | 4/2018 | Goto |

FOREIGN PATENT DOCUMENTS

| DE | 4234174 C2 | 10/1995 |
| JP | H02-163298 A | 6/1990 |
| JP | H03-211199 A | 9/1991 |
| JP | H05-157518 A | 6/1993 |
| JP | H11-278799 A | 10/1999 |

*Primary Examiner* — Mathew Franklin Gordon
(74) *Attorney, Agent, or Firm* — Birch, Stewart, Kolasch & Birch, LLP

(57) ABSTRACT

A forklift apparatus includes: an error prediction unit configured to predict a first positional error which is a positional error after picking-up between a standard position of a fork and a central position of a pallet on the fork after the pallet is picked up and a first angle error which is an angle error after picking-up with respect to the fork in the pallet; a travel route correction unit configured to correct a travel route from a picking-up position of the pallet to a stacking position of the pallet to offset the first positional error and the first angle error when the pallet is stacked; and a conveyance travel control unit configured to perform travel control such that the pallet is conveyed along the corrected travel route.

8 Claims, 12 Drawing Sheets

FIG. 7

| (RELATIVE POSITION, RELATIVE ANGLE, CENTROID) BEFORE PALLET IS PICKED UP | (RELATIVE POSITION, RELATIVE ANGLE, CENTROID) AFTER PALLET IS PICKED UP |
|---|---|
| $\delta_{1p}, \theta_1, \delta_{1g}$ | $\delta_{1p}', \theta_1', \delta_{1g}'$ |
| $\delta_{2p}, \theta_2, \delta_{2g}$ | $\delta_{2p}', \theta_2', \delta_{2g}'$ |
| $\delta_{3p}, \theta_3, \delta_{3g}$ | $\delta_{3p}', \theta_3', \delta_{3g}'$ |

| PICKING-UP POSITION | STACKING POSITION | ROUTE (R) |
|---|---|---|
| A | B | FIRST ROUTE (R1) |
| A | C | SECOND ROUTE (R2) |
| D | E | THIRD ROUTE (R3) |
| D | F | FOURTH ROUTE (R4) |

1042

… (1) …

FORKLIFT APPARATUS, FORKLIFT CONTROL METHOD, AND NON-TRANSITORY COMPUTER-READABLE MEDIUM

TECHNICAL FIELD

The present disclosure relates to a forklift apparatus, a forklift control method, and a program. Priority is claimed on Japanese Patent Application No. 2018-124449, filed Jun. 29, 2018, the content of which is incorporated herein by reference.

BACKGROUND ART

When forklift apparatuses pick up pallets on which loads are put, convey the pallets to stacking positions, and stack the pallets, errors in which the positions of the stacked pallets deviate from scheduled stacking positions occur in some cases. Therefore, for example, when unmanned forklift apparatuses are automatically driven, the picking-up and stacking of the pallets are repeated, the errors accumulate and exceed allowable errors, and thus there is a possibility of pallets not being able to be picked up and finally stacked by the forklift apparatuses or there is a possibility of loads collapsing. Patent Literature 1 discloses a technology for aligning central lines of forks with central lines of the pallets at the time of picking-up of pallets without accumulation of errors. Patent Literature 2 discloses a technology for correcting an error by laterally displacing forks by an error when pallets are stacked.

CITATION LIST

Patent Literature

[Patent Literature 1]
 Japanese Unexamined Patent Application, First Publication No. Hei 3-211199
[Patent Literature 2]
 Japanese Unexamined Patent Application, First Publication No. Hei 2-163298

SUMMARY

In recent years, with an increase in an amount of distribution or acceleration of distribution, it is imperative to shorten a cycle time of work of an unmanned forklift apparatus. However, in unmanned forklift apparatuses of the related art, it takes time to convey loads due to operations of operating forks in the lateral direction (side shifting) before pallets are picked up, adjustment of fork intervals for detecting positions of the pallets, many other sensing processes.

An object of the present disclosure is to provide a forklift apparatus, a forklift control method, and a program capable of quickly conveying a load of a forklift apparatus to shorten a cycle time of work of an unmanned forklift apparatus.

According to an aspect of the present disclosure, there is provided a forklift apparatus including: an error prediction unit configured to predict a first positional error which is a positional error after picking-up between a standard position of a fork and a central position of a pallet on the fork after the pallet is picked up and a first angle error which is an angle error after picking-up with respect to the fork in the pallet; a travel route correction unit configured to correct a travel route from a picking-up position of the pallet to a stacking position of the pallet to offset the first positional error and the first angle error when the pallet is stacked; and a conveyance travel control unit configured to perform travel control such that the pallet is conveyed along the corrected travel route.

According to at least one of the foregoing aspects, it is possible to quickly convey a load of a forklift apparatus.

BRIEF DESCRIPTION OF DRAWINGS

FIG. 7 is a first explanatory diagram illustrating a structure of data of error information according to a first embodiment which is stored as a database in a storage unit.

FIG. 8 is a second explanatory diagram illustrating a structure of data of travel route information according to the first embodiment which is stored as a database in a storage unit.

DESCRIPTION OF EMBODIMENTS

First Embodiment

Hereinafter, a forklift apparatus 10 according to a first embodiment will be described with reference to FIGS. 1 to 12.
(Overall Configuration)

Figure 1:
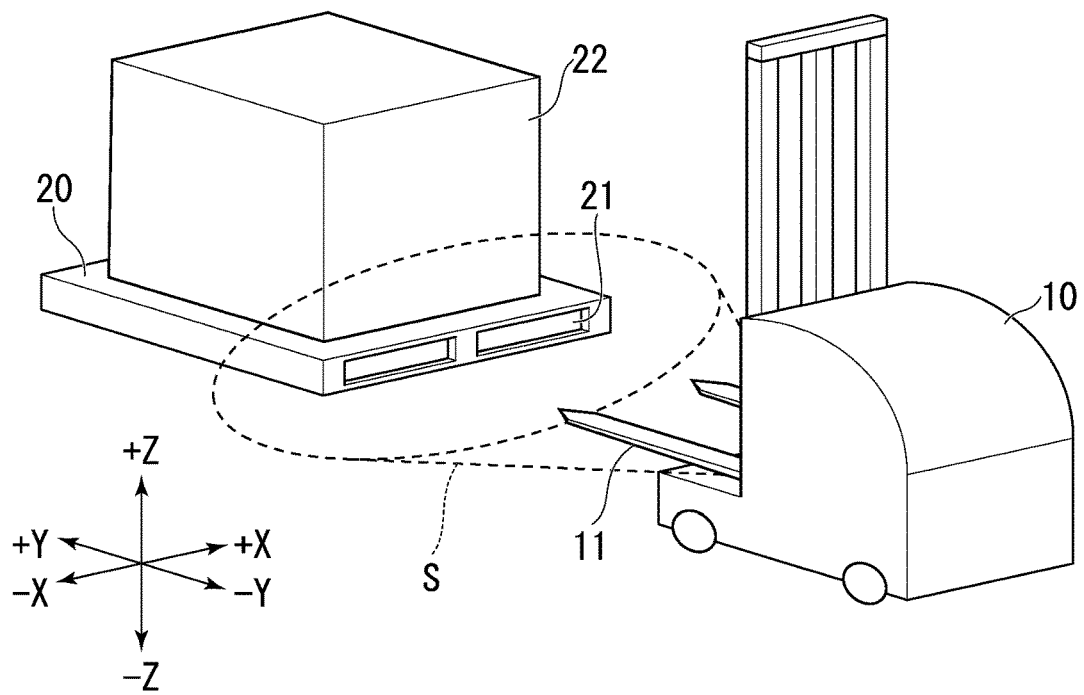
FIG. 1 is an explanatory diagram illustrating an overview of a forklift apparatus according to a first embodiment.
Figure 2:
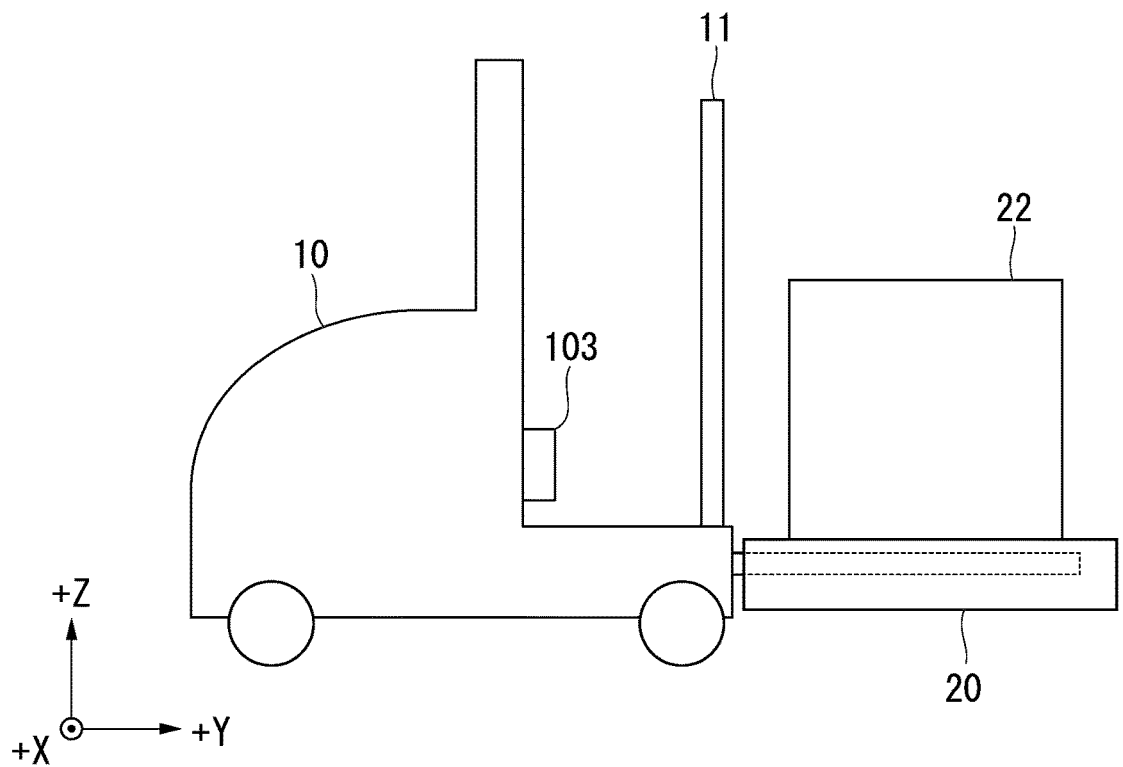
FIG. 2 is a side view illustrating the forklift apparatus according to the first embodiment.

FIG. 1 is an explanatory diagram illustrating an overview of a forklift apparatus 10 according to the first embodiment. FIG. 2 is a side view illustrating the forklift apparatus 10 according to the first embodiment. The forklift apparatus 10 includes a fork 11 and a camera 103. The forklift apparatus 10 can insert the fork 11 into holes 21 of the pallet 20 and pick up a pallet 20 on which a load 22 is stacked. The pallet 20 is a loading stand used for distribution in order for a load 22 to be placed thereon. The pallet 20 is, for example, a wooden pallet, a synthetic resin pallet, a metal pallet, or a paper pallet. The holes 21 are two holes formed on s side surface of the pallet 20. Here, the number of holes 21 is not limited to 2.

In the following description, an extension direction of the fork 11 included in the forklift apparatus 10 is assumed to be a ±Y direction (an end side of the fork 11 is assumed to be the +Y side) and a direction orthogonal to the extension direction of the forks on a loading surface of the fork 11 is assumed to be a ±X direction (the right-hand side when viewed from the base side of the fork 11 is assumed to be the +X side). A direction orthogonal to the loading surface of the fork 11 is assumed to be the ±Z direction (the upper side of the loading surface is assumed to be the +Z side). In the embodiment, a case in which the loading surface of the fork 11 is parallel to the horizontal direction will be described. However, the loading surface of the fork 11 may not be parallel to the horizontal direction.

(Functional Configuration of Forklift Apparatus)

Figure 3:
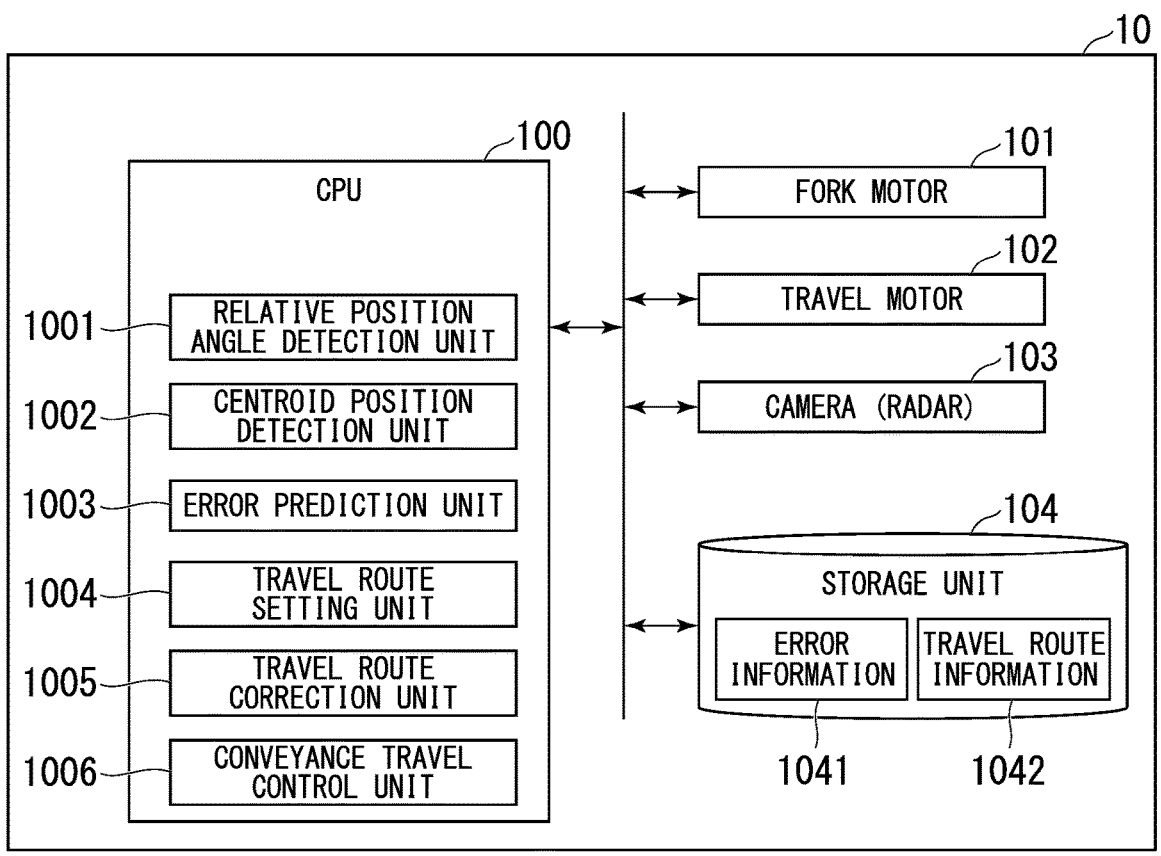
FIG. 3 is an explanatory diagram illustrating a functional configuration of the forklift apparatus according to the first embodiment.

FIG. 3 is an explanatory diagram illustrating a functional configuration of the forklift apparatus 10 according to the first embodiment.

As illustrated in FIG. 3, the forklift apparatus 10 includes a CPU 100, a fork motor 101, a travel motor 102, a camera 103, and a storage unit 104.

The CPU 100 is a processor that operates according to a program prepared in advance to fulfill various functions and is in charge of overall operations of the forklift apparatus 10.

The CPU 100 functions as a relative position angle detection unit 1001, a centroid position detection unit 1002, an error prediction unit 1003, a travel route setting unit 1004, a travel route correction unit 1005, and a conveyance travel control unit 1006.

The relative position angle detection unit 1001 detects a relative position $\delta_p$ before picking-up and a relative angle $\theta$ before picking-up between a central position O of the pallet 20 and a standard position M of the fork 11 before the forklift apparatus 10 picks up the pallet 20. The relative position $\delta_p$ before picking-up and the relative angle $\theta$ before picking-up will be described later with reference to FIG. 4(a). Specifically, the relative position angle detection unit 1001 first acquires image information of the holes 21 and image information of the load 22 imaged by the camera 103 before the pallet 20 is picked up. Subsequently, the relative position angle detection unit 1001 detects the relative position $\delta_p$ before picking-up and the relative angle $\theta$ before picking-up between the central position O of the pallet 20 and the standard position M of the fork 11 based on the acquired image information of the holes 21.

Here, the relative position $\delta_p$ before picking-up and the relative angle $\theta$ before picking-up are detected based on the detected image information of the holes 21, but may be detected based on the image information of the pallet 20.

The centroid position detection unit 1002 detects a centroid position (a position of a center of gravity) $\delta_g$ before picking-up in the load 22 on the pallet 20 based on the image information of the load 22 imaged by the camera 103. The centroid position $\delta_g$ before picking-up may be a centroid position of the load 22 calculated from a width, a depth, and a height of the load 22 obtained from the image information of the load 22 imaged by the camera 103.

In prediction of a first positional error $\delta_p'$, which is a positional error after picking-up between the standard position M of the fork 11 and the central position O of the pallet 20 on the fork 11 after the pallet 20 is picked up, and a first angle error $\theta'$ which is an angle error after picking-up with respect to the fork 11 of the pallet 20, the CPU 100 may not include the centroid position detection unit 1002 when the centroid position $\delta_g$ before picking-up in the load 22 before the pallet 20 is picked up is unnecessary.

The error prediction unit 1003 predicts the first positional error $\delta_p'$ which is a positional error after picking-up between the standard position M of the fork 11 and the central position O of the pallet 20 on the fork 11 after the pallet 20 is picked up, the first angle error $\theta'$ which is an angle error after picking-up with respect to the fork 11 of the pallet 20, and the centroid position $\delta_g'$ after picking-up. The first positional error $\delta_p'$, the first angle error $\theta'$, and the centroid position $\delta_g'$ after picking-up will be described later with reference to FIG. 4(b).

Specifically, based on the detected relative position $\delta_p$ before picking-up, the detected relative angle $\theta$ before picking-up, the detected centroid position $\delta_g$ before picking-up, and preset error information 1041, the error prediction unit 1003 predicts the first positional error $\delta_p'$ which is a positional error after picking-up between the standard position M of the fork 11 and the central position O of the pallet 20 on the fork 11 after the pallet 20 is picked up for unloading, the first angle error $\theta'$ which is an angle error after picking-up with respect to the fork 11 of the pallet 20, and the centroid position $\delta_g'$ after picking-up. Here, the error information 1041 is information in which the relative position $\delta_p$ before picking-up, the relative angle $\theta$ before picking-up, and the centroid position $\delta_g$ before picking-up are associated with the first positional error $\delta_p'$, the first angle error $\theta'$, and the centroid position $\delta_g'$ after picking-up after the pallet 20 is picked up for unloading. Accordingly, based on the detected relative position $\delta_p$ before picking-up, the detected relative angle $\theta$ before picking-up, and the detected centroid position $\delta_g$ before picking-up, the error prediction unit 1003 can predict the first positional error $\delta_p'$, the first angle error $\theta'$, and the centroid position $\delta_g'$ after picking-up without physical analysis in real time.

Thus, it is possible to reduce a time taken to predict physical analysis of the first positional error, the first angle error, and the centroid position after picking-up in real time.

The first positional error $\delta_p'$, the first angle error $\theta'$, and the centroid position $\delta_g'$ after picking-up may be detected with image information imaged by the camera 103 or the like after the forklift apparatus 10 picks up the pallet 20, instead of being predicted before the pallet 20 is picked up.

The travel route setting unit 1004 sets a travel route R from the picking-up position of the pallet 20 to the stacking position of the pallet 20. Specifically, the travel route setting unit 1004 sets the travel route R based on the picking-up position of the pallet 20 and the stacking position of the pallet 20 with reference to travel route information 1042 of the storage unit 104.

The travel route correction unit 1005 corrects the travel route R set in advance from the picking-up position of the pallet 20 to the stacking position of the pallet 20 to offset a stacking error occurring due to the first positional error $\delta_p'$ and the first angle error $\theta'$ when the pallet 20 is stacked. The offsetting of the stacking error will be described later.

The conveyance travel control unit 1006 performs travel control such that the pallet 20 is conveyed along the corrected travel route R'. Specifically, the conveyance travel control unit 1006 performs travel control such that the pallet 20 is conveyed so that the forklift apparatus 10 picking up the pallet 20 is caused to travel from the picking-up position of the pallet 20 to the stacking position along the corrected travel route R'.

The fork motor 101 operates so that the fork 11 is driven upwards or downwards to pick up or stack the pallet 20. In the embodiment, the case in which the conveyance travel control unit 1006 controls an operation of the fork motor 101 will be described. In other embodiments, however, an operation of the fork motor 101 may be controlled by another control unit.

The travel motor 102 operates so that the forklift 10 is caused to travel along the corrected travel route R'.

The camera 103 images the holes 21 of the pallet 20 and the load 22 on the pallet 20 to acquire image information of the holes 21 of the pallet 20 and image information of the load 22 on the pallet 20 before the pallet 20 is picked up. As illustrated in FIG. 2, the camera 103 is mounted on the front surface of the forklift apparatus 10 and acquires image information of an imaging range S. However, a position at which the camera 103 is mounted on the forklift apparatus 10 may be a position at which images of the holes 21 and the load 22 can be acquired and is not limited to the position illustrated in FIG. 2.

The camera 103 may be a device capable of imaging the pallet 20 and the load 22 to acquire the image information thereof or may be a LiDAR camera, a laser radar, or the like.

The storage unit 104 stores the error information 1041 and the travel route information 1042. The error information 1041 of the storage unit 104 is referred to by the error prediction unit 1003 when the error prediction unit 1003 predicts the first positional error $\delta_p$ which is a positional error after the pallet 20 is picked up for unloading, the first angle error $\theta'$ which is an angle error after picking-up, and the centroid position $\delta_g'$ after picking-up. The travel route information 1042 of the storage unit 104 is information in which the picking-up position (start location) of the pallet 20, the stacking position (a goal location) of the pallet 20, and the travel route R are associated with each other. The travel route information 1042 is referred to by the travel route setting unit 1004 when the travel route setting unit 1004 sets the travel route R.

The storage unit 104 is a large capacity storage device (a nonvolatile memory) contained in the forklift apparatus 10 and is, for example, a hard disk drive (HDD), a solid-state drive (SSD), or the like. The storage unit 104 is called an auxiliary storage device and records acquired information.

(Positional Error After Picking-Up and Angle Error After Picking-Up)

In the first embodiment, the first positional error which is a positional error after the picking-up of the pallet 20 and the first angle error which is an angle error after picking-up, which occur after the forklift apparatus 10 picks up the pallet 20 up to obtain a load are corrected. Hereinafter, a first positional error which is a positional error after picking-up and a first angle error which is an angle error after the picking-up of the pallet 20 which is a correction target will be described with reference to FIGS. 4 and 5.

Figure 4:
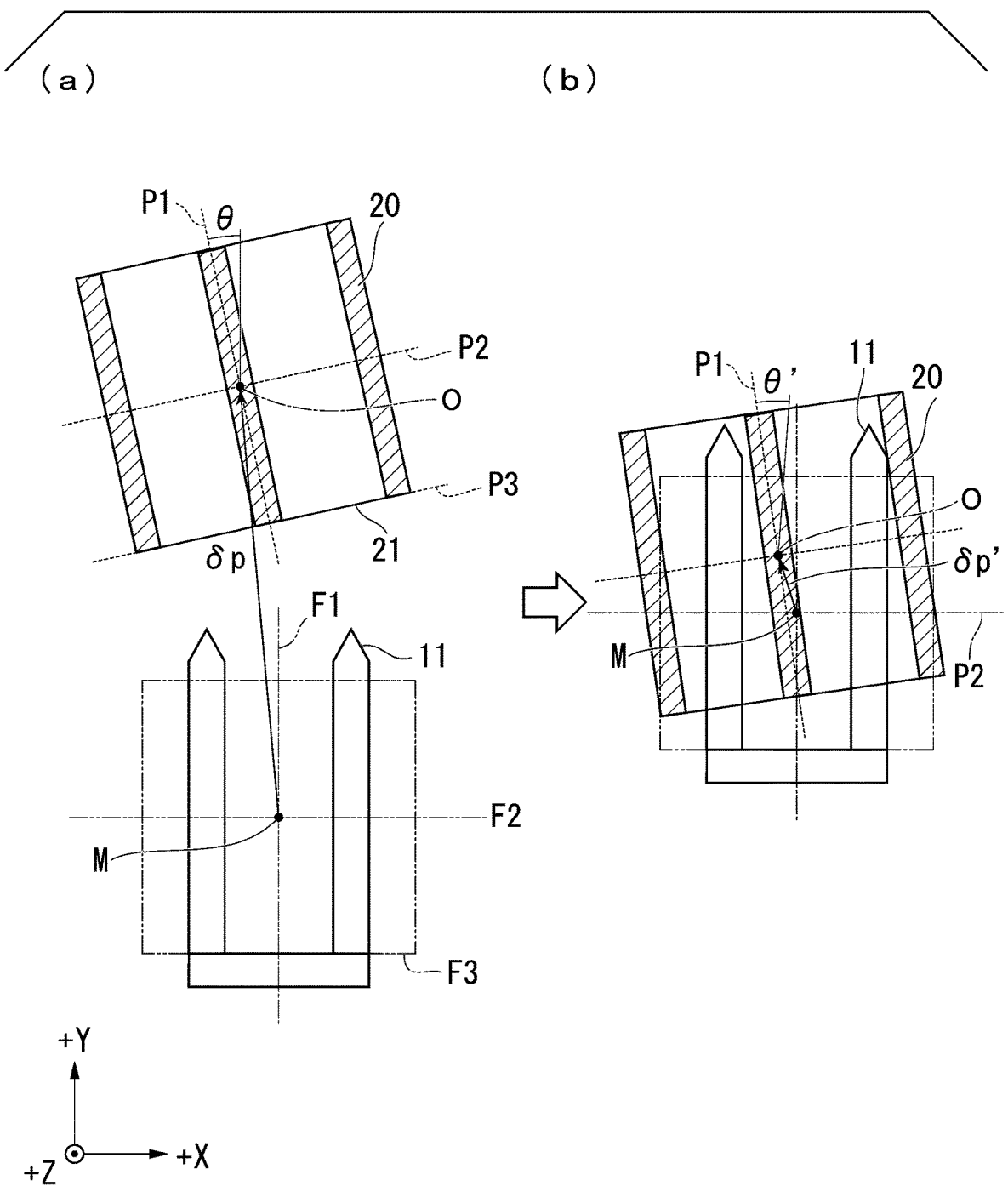
FIG. 4 is an explanatory diagram illustrating a positional error after picking-up and an angle error after picking-up occurring after a pallet is picked up for unloading by the forklift apparatus.

FIG. 4 is an explanatory diagram illustrating a positional error after picking-up and an angle error after picking-up occurring after a pallet 20 is picked up for unloading by the forklift apparatus 10.

FIG. 4(a) illustrates a situation before the forklift apparatus 10 picks up the pallet 20. As illustrated in FIG. 4(a), deviation (the relative position $\delta_p$ before picking-up and the relative angle $\theta$ before picking-up) occurs between the central position O of the pallet 20 and the standard position M of the fork 11. The central position O is a central position of the pallet 20 and is specifically a position indicating an intersection between central lines P1 and P2 of the pallet 20. The standard position M is a position regulated as a standard with respect to the fork 11 and is specifically a position indicating an intersection between central lines F1 and F2 of the fork 11.

The relative position $\delta_p$ before picking-up includes both an error $\delta_x$ in the ±X direction and an error $\delta_y$ in the ±Y direction between the standard position M and the central position O. Here, the relative position $\delta_p$ before picking-up may be represented with ($\delta_x$, $\delta_y$). The relative angle $\theta$ before picking-up is deviation in angle of the central line P1 of the pallet 20 with respect to the central line F1 of the fork 11.

In the situation illustrated in FIG. 4(a), the forklift apparatus 10 detects a position of the pallet 20 before the picking-up of the pallet 20 and the forklift apparatus 10 moves toward the pallet directly to pick up the pallet 20 to obtain a load. At this time, as illustrated in FIG. 4(b), deviation (the first positional error $\delta_p'$ which is a positional error after picking-up and the first angle error $\theta'$ which is an angle error after picking-up) occurs between the central position O of the pallet 20 and the standard position M of the fork 11.

Here, for the standard position M, the central position O is assumed to be aligned with the standard position M when the pallet 20 is stacked so that the pallet 20 is aligned with a central line F1 of the fork 11 and a side surface P3 of the holes 21 of the pallet 20 is aligned with a base surface F3 of the fork 11. The first positional error which is a positional error after picking-up includes both an error $\delta_x'$ in the ±X direction and an error $\delta_y'$ in the ±Y direction between the standard position M and the central position O when the pallet 20 is picked up by the fork 11. Here, the first positional error $\delta_p'$ may be represented with ($\delta_x'$, $\delta_y'$). The first angle error $\theta'$ is deviation in angle of the central line F1 of the fork 11 with respect to the central line P1 of the pallet 20.

When the pallets are picked up and stacked a plurality of times without correcting the first positional error $\delta_p'$ and the first angle error $\theta'$, the first positional error $\delta_p'$ and the first angle error $\theta'$ accumulate, and thus there is a possibility of the accumulated error exceeding an allowable error in which the pallets can be stacked at the stacking position of the pallets.

Figure 5:
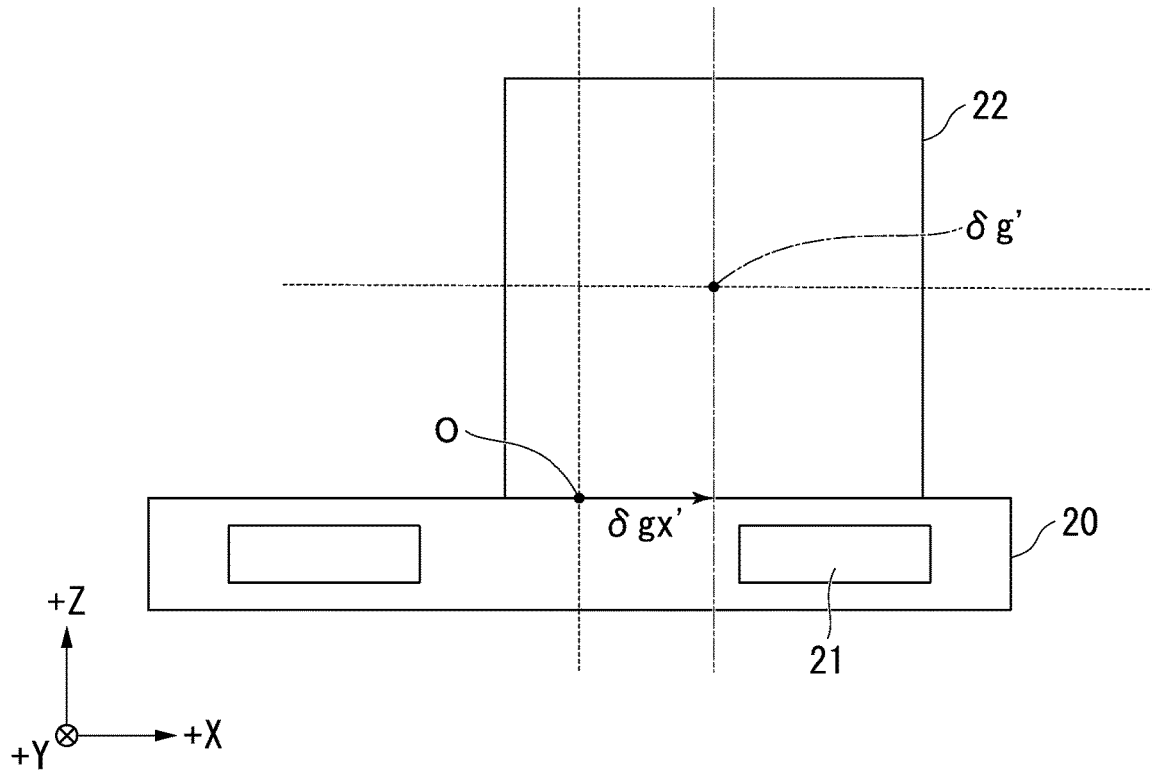
FIG. 5 is an explanatory diagram illustrating a centroid position after the pallet is picked up for unloading by the forklift apparatus.

The first positional error $\delta_p'$ which is a positional error after picking-up and the first angle error $\theta'$ which is an angle error after picking-up in the pallet 20 depend on a centroid position of the load 22 on the pallet 20. Hereinafter, a relation between the centroid position of the load 22, and the first positional error $\delta_p'$ and the first angle error $\theta'$ will be described. FIG. 5 is an explanatory diagram illustrating a centroid position after the pallet 20 is picked up for unloading by the forklift apparatus 10.

In FIG. 5, the load 22 on the pallet 20 is not placed at the central position O of the pallet 20 and is placed biased in the +X direction. At this time, the centroid position $\delta_g'$ of the load 22 deviates by $+\delta_{gx}'$ from the central position O of the pallet 20 in the X direction. Therefore, when the forklift apparatus 10 moves the pallet 20 without correction, the pallet 20 deviates or rotates with respect to the fork 11, and thus there is a possibility of further positional error and the angle error occurring.

That is, when the pallets are picked up and stacked a plurality of times without considering the centroid positions after the pallets 20 are picked up for unloading, the positional error and the angle error accumulate, and thus there is a possibility of the accumulated error exceeding an allowable error in which the pallets can be stacked at the stacking position of the pallets.

Figure 6:
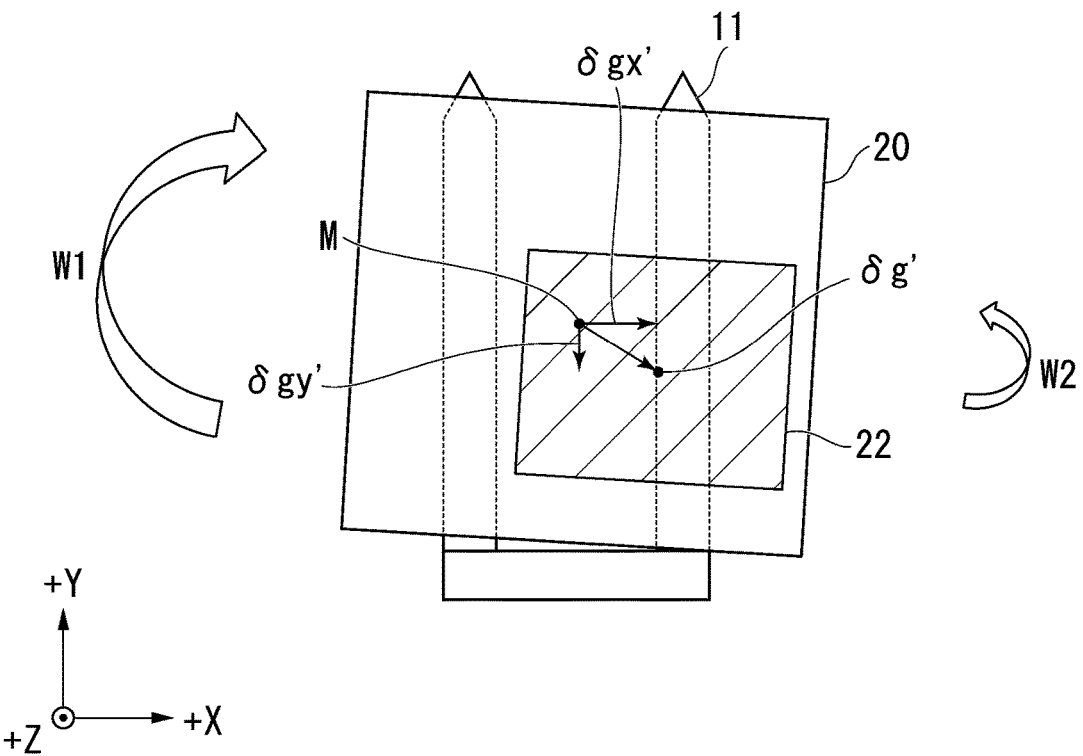
FIG. 6 is an explanatory diagram illustrating easiness of rotation of the pallet due to deviation of the centroid position of the load.

FIG. 6 is an explanatory diagram illustrating easiness of rotation of the pallet 20 due to deviation of the centroid position $\delta_g$ of the load 22.

In FIG. 6, the load 22 on the pallet 20 is not placed at the central position O of the pallet 20 and is biased by $+\delta_{gx}'$ in the +X direction and by $-\delta_{gy}'$ in the -Y direction. At this time, it is easy for the pallet 20 on the fork 11 to rotate clockwise (W1) with respect to the fork 11 and it is difficult for the pallet 20 to rotate counterclockwise (W2).

(Error Information)

Next, the error information 1041 stored in the storage unit 104 will be described.

FIG. 7 is a first explanatory diagram illustrating a structure of data of the error information 1041 according to the first embodiment which is stored as a database in the storage unit 104.

As illustrated in FIG. 7, a first column shows the relative position $\delta_p$ before picking-up, the relative position $\theta$ before picking-up, and the centroid position $\delta_g$ before picking-up in the pallet 20 with respect to the fork 11 before the pallet 20 is picked up for unloading. A second column shows the first positional error $\delta_p'$ which is a positional error after picking-up after the pallet 20 is picked up for unloading, the first angle error $\theta'$ which is an angle error after picking-up, and the centroid position $\delta_g'$ after picking-up. When a relative position before picking-up, a relative angle before picking-up, and a centroid position before picking-up which are detected by the relative position angle detection unit 1001 before the picking-up of the pallet 20 are $\delta_{1p}$, $\theta_1$, $\delta_{1g}$, respectively, a first positional error which is a positional error after the picking-up of the pallet 20, a first angle error which is an angle error after picking-up, and the centroid position after picking-up are predicted to be $\delta_{1p}'$, $\theta_1'$, $\delta_{1g}'$. When a relative position before picking-up, a relative angle before picking-up, and a centroid position before picking-up which are detected by the relative position angle detection unit 1001 before the picking-up of the pallet 20 are $\delta_{2p}$, $\theta_2$, $\delta_{2g}$, respectively, a first positional error which is a positional error after the picking-up of the pallet 20, a first angle error which is an angle error after picking-up, and the centroid position after picking-up are predicted to be $\delta_{2p}'$, $\theta_2'$, $\delta_{2g}'$. When a relative position before picking-up, a relative angle before picking-up, and a centroid position before picking-up which are detected by the relative position angle detection unit 1001 before the picking-up of the pallet 20 are $\delta_{3p}$, $\theta_3$, $\delta_{3g}$, respectively, a first positional error which is a positional error after the picking-up of the pallet 20, a first angle error which is an angle error after picking-up, and the centroid position after picking-up are predicted to be $\delta_{3p}'$, $\theta_3'$, $\delta_{3g}'$.

Associating the relative position before the picking-up of the pallet 20, the relative angle before picking-up, and the centroid position before picking-up with the first positional error which is a positional error after the picking-up of the pallet 20, the first angle error which is an angle error after picking-up, and the centroid position after picking-up may be performed in advance using large-scale analysis in consideration of friction between at least two of the fork 11, the pallet 20, and the load 22 and an influence of the centroid position of the load 22 illustrated in FIG. 6, and the associated information may be stored in the error information 1041. Thus, even when there is a variation in the state of the load 22, countermeasures can be taken robustly. A value of the friction between at least two of the fork 11, the pallet 20, and the load 22 may be known.

Instead of the embodiment in which the error information 1041 is used, a relative position of the pallet 20 with respect to the fork 11 before the picking-up of the pallet 20, a relative angle before picking-up, and a centroid position before picking-up may be physically analyzed in real time, and the first positional error which is a positional error after the picking-up of the pallet 20, a first angle error which is an angle error after picking-up, and the centroid position after picking-up may be calculated.

(Travel Route Information)

Next, the travel route information 1042 stored in the storage unit 104 will be described.

FIG. 8 is a second explanatory diagram illustrating a structure of data of the travel route information 1042 according to the first embodiment which is stored as a database in the storage unit 104.

As illustrated in FIG. 8, a first column shows positions of picking-up positions (start locations). A second column shows positions of stacking positions (goal locations). A third column shows routes from the picking-up positions to the stacking positions. When the picking-up position is A and the stacking position is B, the route is set to a first route in the first row. When the picking-up position is A and the stacking position is C, the route is set to a second route in the second row. When the picking-up position is D and the stacking position is E, the route is set to a third route in the third row. When the picking-up position is D and the stacking position is F, the route is set to a fourth route in the fourth row. In this way, the route is set with the picking-up position and the stacking position. In the following description, a picking-up position is assumed to be A, a stacking position is assumed to be B, and the travel route is assumed to be R1.

A method of setting a route is not limited to the above-described method as long as the route from the picking-up position to the stacking position is uniquely set.

(Process Flow of Forklift Apparatus 10)

Figure 9:
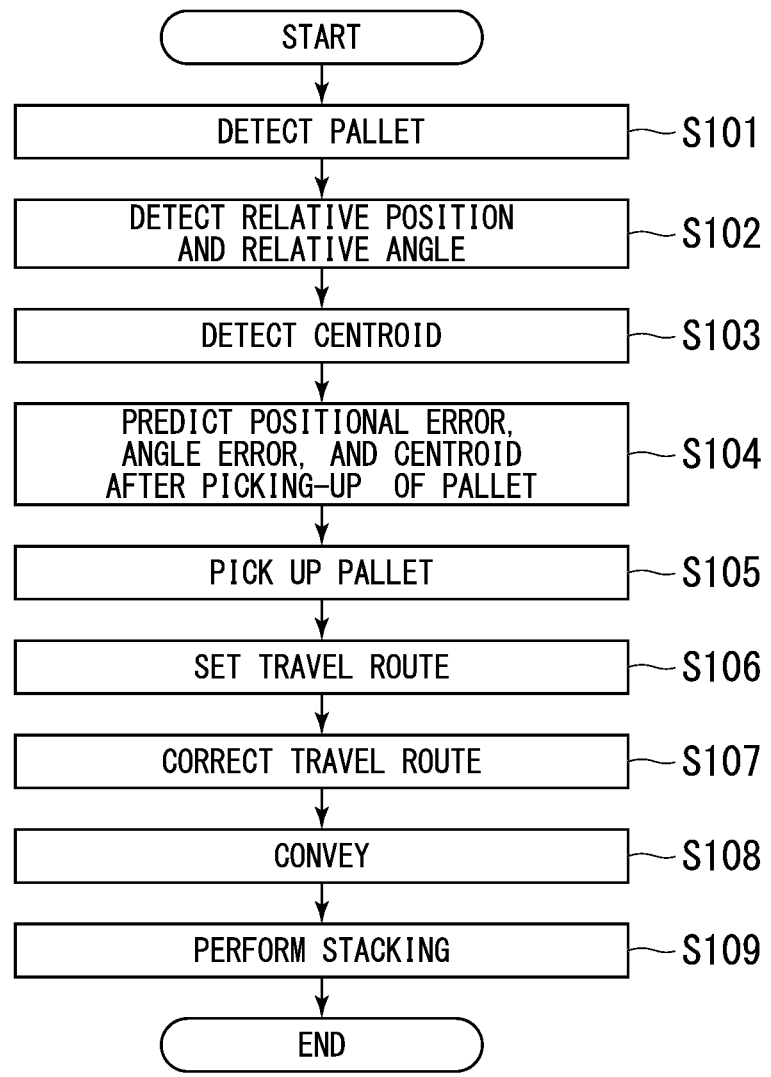
FIG. 9 is an explanatory diagram illustrating a process flow of the forklift apparatus according to the first embodiment.

FIG. 9 is an explanatory diagram illustrating a process flow of the forklift apparatus 10 according to the first embodiment.

The process flow illustrated in FIG. 9 is repeatedly performed during operation of the forklift apparatus 10.

First, the camera 103 acquires image information of the holes 21 of the pallet 20 and image information of the load 22. The relative position angle detection unit 1001 detects the pallet 20 based on the image information of the holes 21 of the pallet 20 (step S101). Subsequently, the relative position angle detection unit 1001 detects the relative position $\delta_p$ before picking-up and the relative angle $\theta$ before picking-up between the central position O of the pallet 20 and the standard position M of the fork 11 based on the image information of the detected holes 21 (step S102).

Subsequently, the centroid position detection unit 1002 detects the centroid position $\delta g$ before the picking-up of the load 22 on the pallet 20 based on the image information of the load 22 captured by the camera 103 (step S103).

The error prediction unit 1003 predicts the first positional error $\delta_p'$ which is a positional error after picking-up between the standard position M of the fork 11 and the central position O of the pallet 20 on the fork 11 after the picking-up of the pallet 20, the first angle error $\theta'$ which is an angle error after the picking-up of the pallet 20 with respect to the fork 11, and the centroid position $\delta_g'$ after picking-up (step S104). Specifically, based on the detected relative position $\delta_p$ before picking-up, the detected relative angle $\theta$ before picking-up, the detected centroid position $\delta_g$ before picking-up, and the error information 1041 defined in advance, the error prediction unit 1003 predicts the first positional error $\delta_p'$ which is a positional error after picking-up between the standard position M of the fork 11 and the central position O of the pallet 20 on the fork 11 after the pallet 20 is picked up for unloading, the first angle error $\theta'$ which is an angle error after the picking-up of the pallet 20 with respect to the fork 11, and the centroid position $\delta_g'$ after the picking-up of the pallet 20 with respect to the fork 11. Here, the error information 1041 is information in which the relative position $\delta_p$ before picking-up, the relative angle $\theta$ before picking-up, and the centroid position $\delta_g$ before picking-up are associated with the first positional error $\delta_p'$, the first angle error $\theta'$, and the centroid position $\delta_g'$ after picking-up after the pallet 20 is picked for unloading. Accordingly, based on the detected relative position $\delta_p$ before picking-up, the detected relative angle $\theta$ before picking-up, and the detected centroid position $\delta_g$ before picking-up, the error prediction unit 1003 can predict the first positional error $\delta_p'$, the first angle error $\theta'$, and the centroid position $\delta_g'$ after picking-up in real time without physical analysis.

Thus, it is possible to reduce a time taken to predict physical analysis the first positional error, the first angle error, and the centroid position after picking-up in real time.

Subsequently, the forklift apparatus 10 picks up the pallet 20 for unloading (step S105).

The travel route setting unit 1004 sets the travel route R1 from the picking-up position A of the pallet 20 to the stacking position B of the pallet 20 (step S106). For example, in the case of the picking-up position A and the stacking position B, the travel route setting unit 1004 sets the travel route R1 with reference to the travel route information 1042 of the storage unit 104, as illustrated in FIG. 8.

The travel route correction unit 1005 corrects the travel route R1 set in advance from the picking-up position A of the pallet 20 to the stacking position B of the pallet 20 to offset a stacking error occurring due to the first positional error $\delta_p'$ and the first angle error $\theta'$ when the pallet 20 is stacked (step S107). Hereinafter, a procedure in which the travel route correction unit 1005 corrects the travel route R1 to the travel route R1' will be described.

A procedure in which the error occurring in the picking-up of the pallet 20 is offset at the stacking position B through the correction of the travel route R1 will be described with reference to FIGS. 10 to 12.

Figure 10:
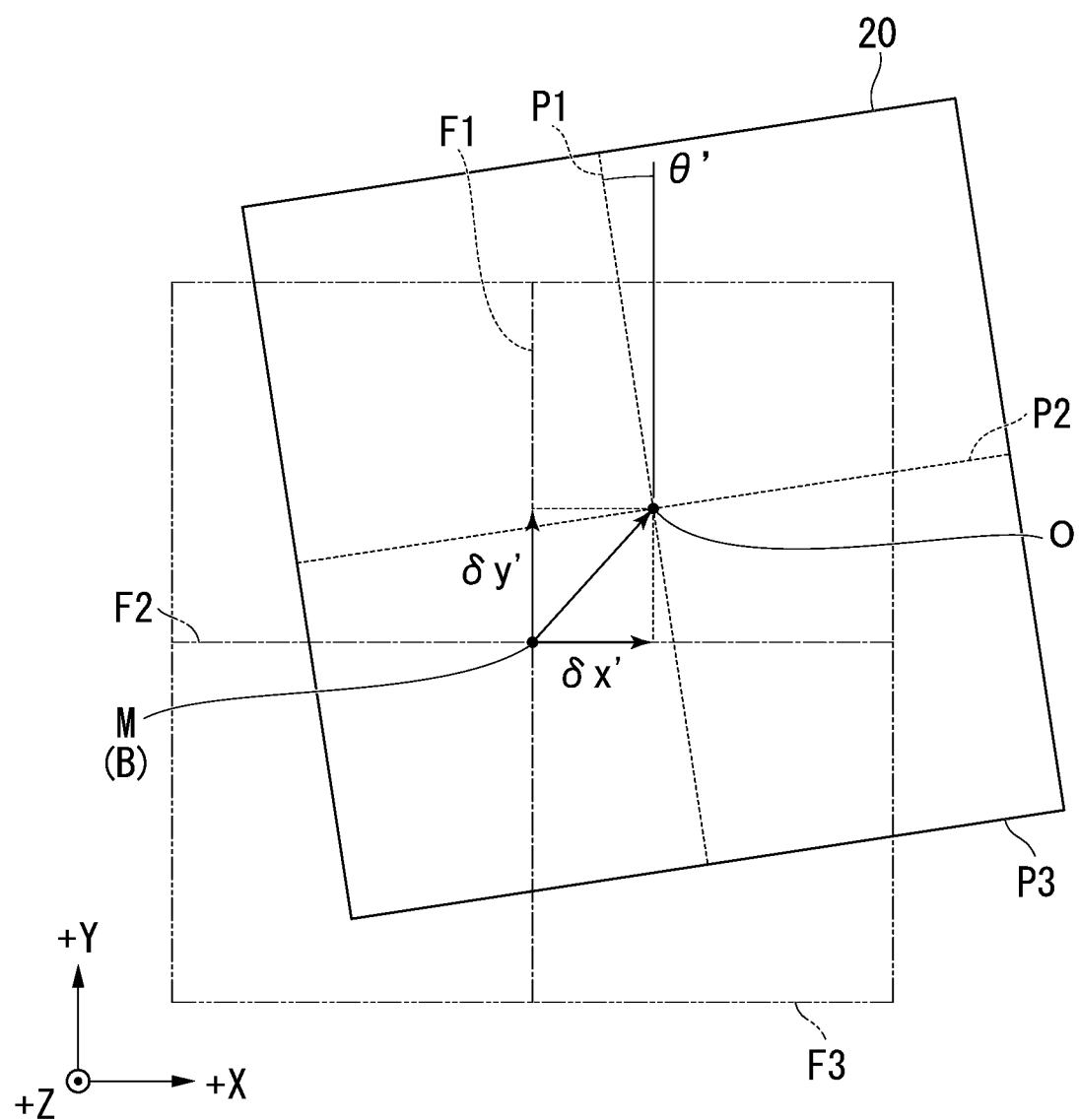
FIG. 10 is a first explanatory diagram illustrating travel route correction by a travel route correction unit according to the first embodiment.
Figure 11:
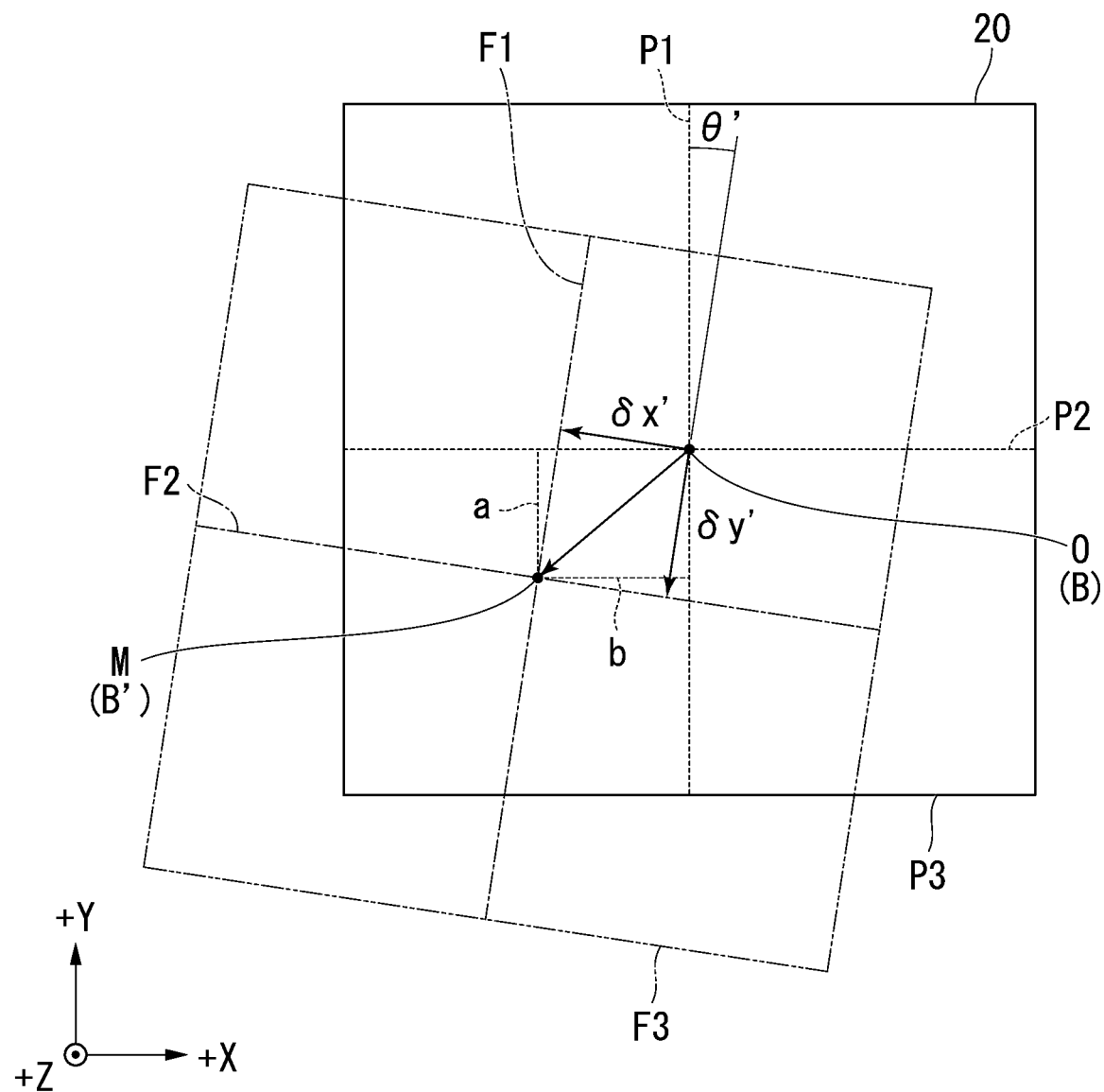
FIG. 11 is a second explanatory diagram illustrating travel route correction by the travel route correction unit according to the first embodiment.
Figure 12:
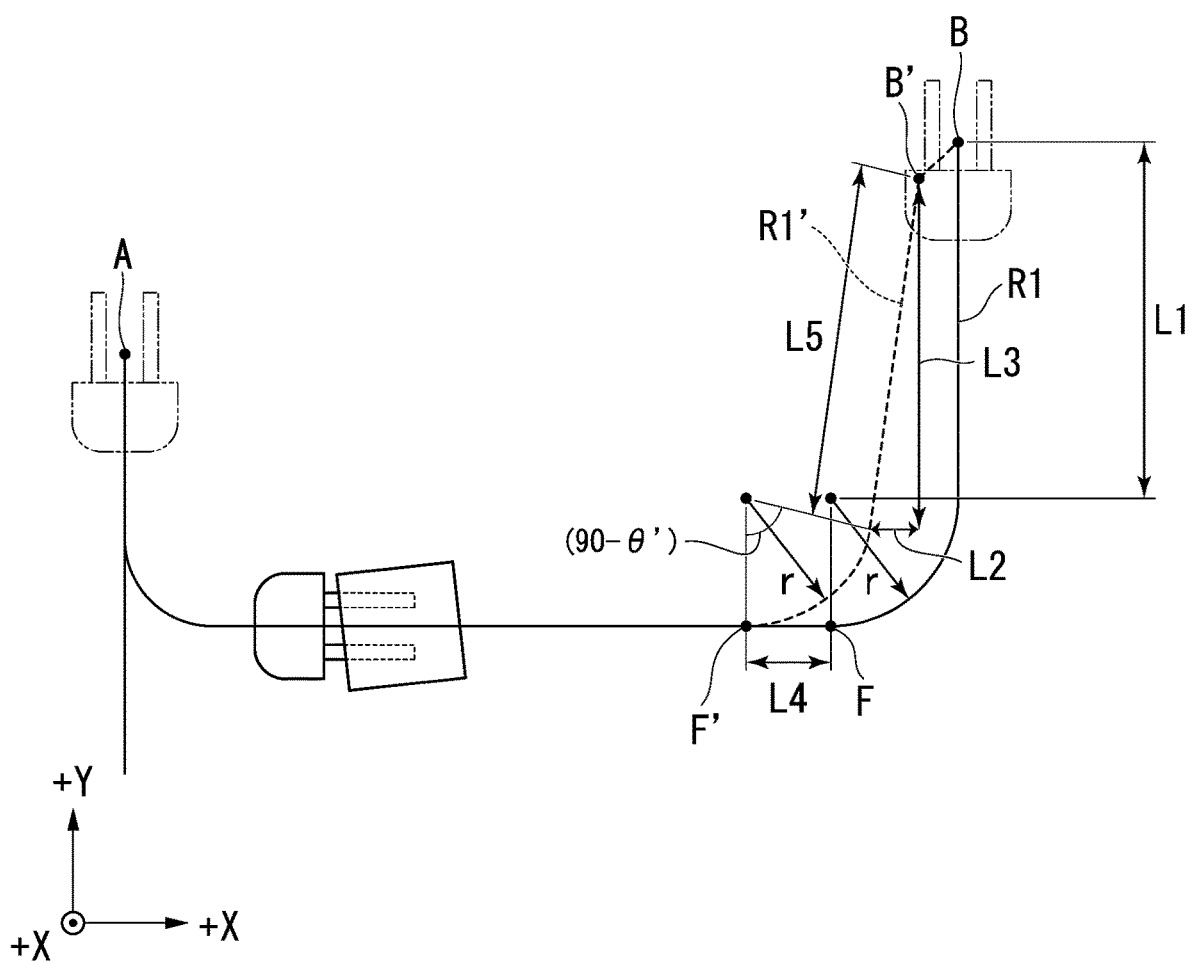
FIG. 12 is a third explanatory diagram illustrating travel route correction by the travel route correction unit according to the first embodiment.

FIGS. 10 to 12 are first to third explanatory diagrams illustrating travel route correction by the travel route correction unit 1005 according to the first embodiment.

FIG. 10 illustrates a positional relation between the standard position M of the fork 11 and the actual central position O of the pallet 20 when the forklift apparatus 10 travels along the set travel route R1 and stacks the pallet 20 by aligning the standard position M of the fork 11 with the stacking position B.

As illustrated in FIG. 10, when the forklift apparatus 10 travels along the set travel route R1 and stacks the pallet 20 at the stacking position B, the first positional error $\delta_p'$ ($\delta_x'$, $\delta_y'$) and the first angle error $\theta'$ occur. Accordingly, the stacking position can be corrected to the stacking position B for which the central position O of the pallet 20 is a target by displacing the standard position M of the fork 11 from the stacking position B to a stacking position B', as illustrated in FIG. 11, so that the first positional error $\delta_p'$ ($\delta_x'$, $\delta_y'$) and the first angle error $\theta'$ are offset when the pallet 20 is stacked. Specifically, the travel route R1 is corrected so that the standard position M of the fork 11 is displaced by $-\delta_p'$ ($-a$, $-b$) on the XY plane and the pallet 20 is rotated by $-\theta'$ on the XY plane with respect to the fork 11 at the stacking position B' for stacking. Here, $-a = -\delta_x' \cos\theta - \delta_y' \sin\theta$ and $-b = \delta_x' \sin\theta - \delta_y' \cos\theta$ are satisfied.

For example, the travel route correction unit 1005 may correct the travel route R1 to the travel route R1' illustrated in FIG. 12.

As described above, the first positional error which is a positional error after picking-up between the standard position M of the fork 11 and the central position O of the pallet 20 on the fork 11 after the picking-up of the pallet 20 is $\delta_p'$ ($\delta_x'$, $\delta_y'$). The first angle error which is an angle error after picking-up in the pallet 20 with respect to the fork 11 is $\theta'$. The corrected travel route R1' is a travel route in which the forklift apparatus 10 starts turning at a turning start location F' located in front of a turning start location F of the preset travel route R1 by a distance L4, turns by an angle (90−$\theta'$) with a turning radius r, travels by a distance L5 after the turning, and stops, as illustrated in FIG. 12. The turning radius r does not change before and after the correction of the travel route R1.

As described with reference to FIG. 11, it is assumed that $-a = -\delta_x' \cos\theta - \delta_y' \sin\theta$ and $-b = \delta_x' \sin\theta - \delta_y' \cos\theta$ are satisfied. At this time, as illustrated in FIG. 12, L3=L1+r sin $\theta$−b, L2=(L1+r sin $\theta$−b)tan $\theta$, L4=r cos $\theta$+L2+a−r, and L5=(L1−b)+cos $\theta$+r tan $\theta$ are satisfied.

Accordingly, the travel route R1' is a travel route in which the forklift apparatus 10 starts turning in front of the turning start location F of the preset travel route R1 by L4=r cos $\theta$+(L1+r sin $\theta$−b)tan $\theta$+a−r, turns by an angle (90−$\theta'$) at the turning radius r, travels by L5=(L1−b)+cos $\theta$+r tan $\theta$ after the turning, and stops.

Subsequently, the forklift apparatus 10 conveys the pallet 20 along the corrected travel route R1' (step S108). Specifically, the conveyance travel control unit 1006 controls an operation of the travel motor 102 such that the forklift apparatus 10 travels along the corrected travel route R1.

Subsequently, the fork motor 101 performs stacking at the stacking position B' (step S109). Specifically, the conveyance travel control unit 1006 controls an operation of the fork motor 101 such that the forklift apparatus 10 stacks the pallet 20 at the stacking position B'.

As described above, the process content in which the forklift apparatus 10 faces the pallet 20 before the pallet 20 is picked up for unloading, and then picks up the pallet 20, travels, and performs the stacking has been described. A timing at which the pallet 20 is picked up in the process content, timings of the various detections and timings of the predictions may be parallel, before, or after each other. In particular, the timing at which the travel route R1 is set (step S106) and the timing at which the travel route R1 is corrected (step S107) may be any time after the prediction of the first positional error $\delta_p'$, the first angle error $\theta'$, and the centroid position $\delta_g'$ after picking-up and thus may be prior to step S105 in which the pallet 20 is picked up.

(Operations and Advantageous Effects)

The forklift apparatus 10 according to the first embodiment includes: the error prediction unit 1003 configured to predict the first positional error $\delta_p'$ which is a positional error after picking-up between the standard position M of the fork 11 and the central position O of the pallet 20 on the fork 11 after the pallet 20 is picked up, the first angle error $\theta'$ which is an angle error after picking-up with respect to the fork 11 in the pallet 20, and the centroid position $\delta_g'$ after picking-up; the travel route correction unit 1005 configured to correct the travel route R1 from the picking-up position A of the pallet 20 to the stacking position B of the pallet 20 to offset the first positional error $\delta_p'$ and the first angle error $\theta'$ when the pallet 20 is stacked; and the conveyance travel control unit 1006 configured to perform travel control such that the pallet 20 is conveyed along the corrected travel route R1'.

Thus, in the first embodiment, since separate operations such as side shifting of the fork and interval adjustment of the fork are not necessary in the process of correcting the error (the stacking error) occurring when the forklift apparatus 10 picks up and then stack the load 22, a cycle time of work of the forklift apparatus can be shortened, and thus conveyance of the load by the forklift apparatus can be quickly performed.

Further, since the process of correcting the stacking error can be performed through only the correction of the travel route without providing, for example, separate devices such as a side shifting mechanism of the fork and a fork interval adjustment mechanism of the fork, the process of correcting the error can be performed easily at low cost.

(Modification Examples of First Embodiment)

The forklift apparatus 10 according to the first embodiment has been described in detail above. However, a specific aspect of the forklift apparatus 10 is not limited to the above description and various design modifications can be made within the scope of the present disclosure without departing from the gist of the present disclosure.

(First Modification Example of First Embodiment)

For example, in the forklift apparatus 10 according to the first embodiment, in step S104 of FIG. 9, the error prediction unit 1003 predicts the first positional error $\delta_p'$, the first angle error $\theta'$, and the centroid position $\delta_g'$ after picking-up based on the detected relative position $\delta_p$ before picking-up, the detected relative angle $\theta$ before picking-up, and the detected centroid position $\delta_g$ before picking-up, as described above.

Here, as a first modification example of the first embodiment, the error prediction unit 1003 may predict the first positional error $\delta_p'$ and the first angle error $\theta'$ without using the centroid position $\delta_g$ before picking-up.

Specifically, based on the detected relative position $\delta_p$ before picking-up, the detected relative angle $\theta$ before picking-up, and the error information 1041 defined in advance, the error prediction unit 1003 predicts the first positional error $\delta_p'$ which is a positional error after picking-up between the standard position M of the fork 11 and the central position O of the pallet 20 on the fork 11 after the pallet 20 is picked up for unloading and the first angle error $\theta'$ which is an angle error after the picking-up of the pallet 20 with respect to the fork 11. Here, the error information 1041 is information in which the relative position $\delta_p$ before picking-up and the relative angle $\theta$ before picking-up are associated with the first positional error $\delta_p'$ and the first angle error $\theta'$. Accordingly, based on the detected relative position $\delta_p$ before picking-up and the detected relative angle $\theta$ before picking-up, the error prediction unit 1003 can predict the first positional error $\delta_p'$ and the first angle error $\theta'$ in real time without physical analysis.

Thus, it is possible to reduce a time taken to predict by physical analysis of the first positional error $\delta_p'$ and the first angle error $\theta'$ in real time.

By doing so, even the centroid position $\delta_g$ of the load 22 is not detected, the error prediction unit 1003 can predict the first positional error $\delta_p'$ and the first angle error $\theta'$. The first modification example of the first embodiment is effective in a case in which there is no variation in the centroid position of the load 22 on the pallet 20, or the like.

Second Embodiment

Hereinafter, the forklift apparatus 10 according to a second embodiment will be described with reference to FIGS. 13 and 14.

(Functional Configuration of Forklift Apparatus)

Figure 13:
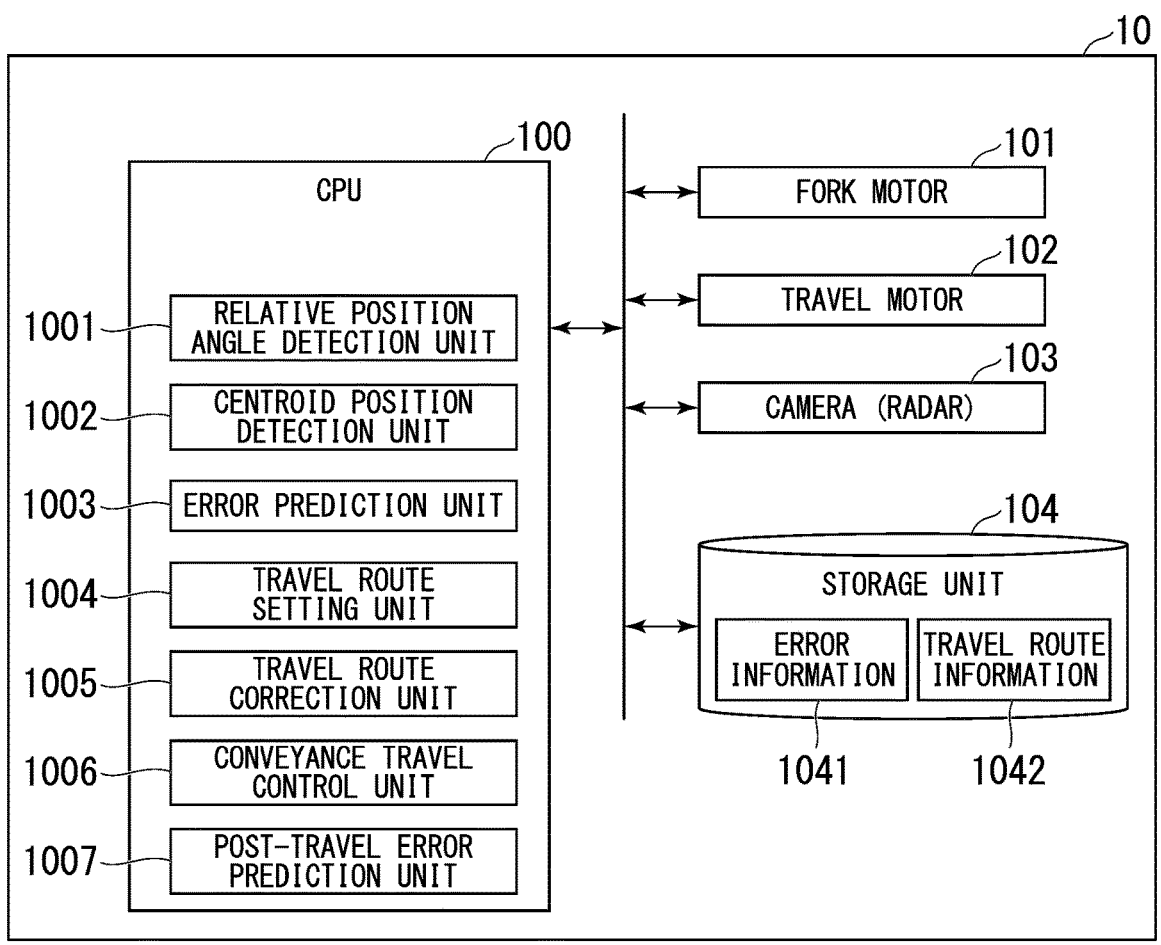
FIG. 13 is an explanatory diagram illustrating a functional configuration of the forklift apparatus according to the second embodiment.

FIG. 13 is an explanatory diagram illustrating a functional configuration of the forklift apparatus 10 according to the second embodiment.

As illustrated in FIG. 13, the CPU 100 of the forklift apparatus 10 according to the second embodiment further fulfills a function of a post-travel error prediction unit 1007 in addition to the first embodiment. Accordingly, each constituent element except for the post-travel error prediction unit 1007 included in the forklift apparatus 10 according to the second embodiment is configured to function similarly to each constituent element of the forklift apparatus 10 according to the first embodiment unless otherwise stated.

Based on the first positional error $\delta_p'$ and the first angle error $\theta'$, the post-travel error prediction unit 1007 predicts a second positional error $\delta_p''$ which is a positional error after the traveling and a second angle error $\theta''$ which is an angle error after the traveling, which occur from the picking-up position A to the stacking position B. For example, the post-travel error prediction unit 1007 may predict the second positional error $\delta_p''$ and the second angle error $\theta''$ based on the first positional error $\delta_p'$, the first angle error $\theta'$, the centroid position $\delta_g'$ after picking-up, the travel route R1, a travel speed, a tilt amount, the weight of the load 22, a frictional coefficient between the fork 11 and the pallet 20, and the like.

The travel route correction unit 1005 corrects the travel route R1 set in advance from the picking-up position A of the pallet 20 to the stacking position B of the pallet 20 to offset a stacking error occurring due to the second positional error $\delta_p''$ and the second angle error $\theta''$ when the pallet 20 is stacked.

(Process Flow of Forklift Apparatus 10)

Figure 14:
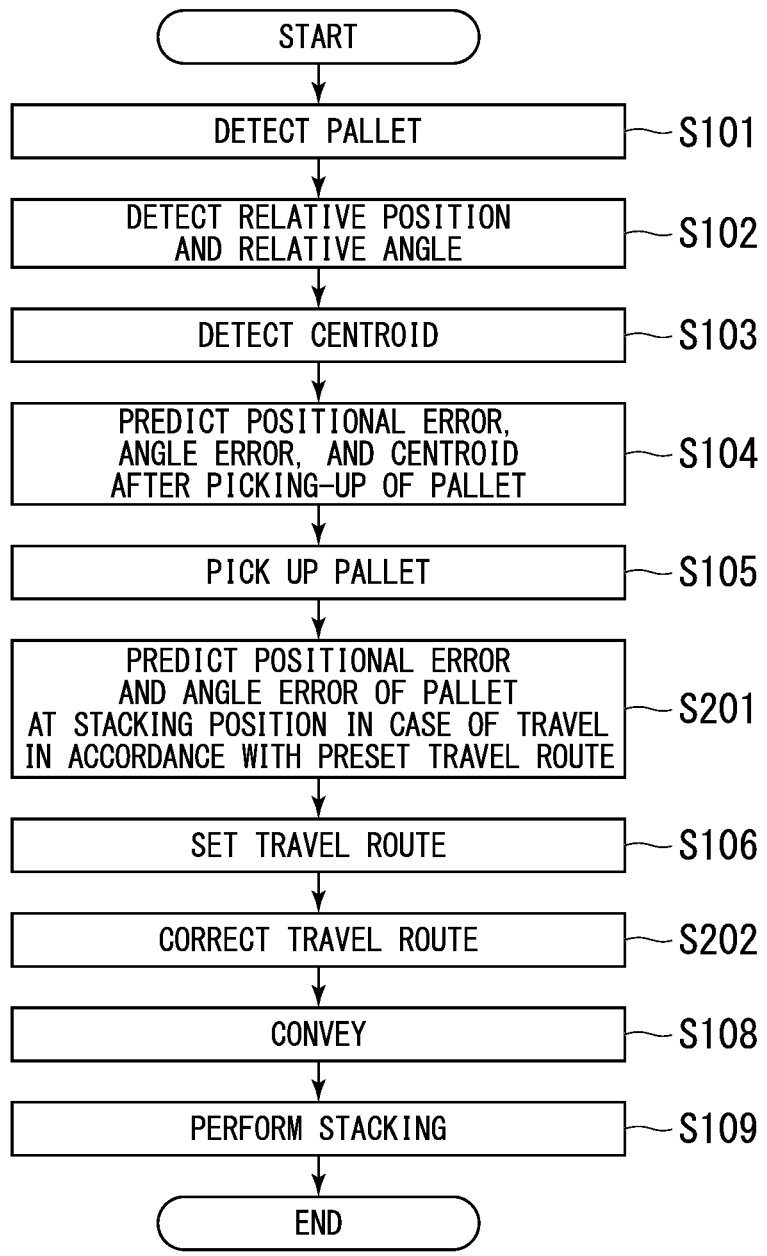
FIG. 14 is an explanatory diagram illustrating a process flow of the forklift apparatus according to the second embodiment.

FIG. 14 is an explanatory diagram illustrating a process flow of the forklift apparatus 10 according to the second embodiment.

The process flow of the forklift apparatus 10 according to the second embodiment illustrated in FIG. 14 is different from the process flow of the forklift apparatus 10 according to the first embodiment illustrated in FIG. 9 in that steps S201 and S202 are further added. In the forklift apparatus 10 according to the second embodiment, processes other than steps S201 and S202 are similar to the processes of the forklift apparatus 10 according to the first embodiment. Thus, different processes will be described below.

As illustrated in FIG. 14, first, processes of steps S101 to S105 are performed similarly to the first embodiment.

Subsequently, after the process of step S105, the process of step S201 is performed. That is, the post-travel error prediction unit 1007 of the forklift apparatus 10 predicts the second positional error $\delta_p''$ which is a positional error after the traveling from the picking-up position A to the stacking position B and the second angle error $\theta''$ which is an angle error after the traveling by applying the first positional error $\delta_p'$, the first angle error $\theta'$, and the centroid position $\delta_g'$ after picking-up to a deviation amount prediction model (step S201). Here, the deviation amount prediction model is a model such as a calculation expression for predicting the second positional error $\delta_p''$ and the second angle error $\theta''$ from prediction values before the picking-up of the pallet 20 (the first positional error $\delta_p'$, the first angle error $\theta'$, and the centroid position $\delta_g'$ after picking-up), the information obtained from a travel program (the travel route R1, the travel speed, and the tilt amount), and the known information (the weight of the load 22 and the frictional coefficient between the fork 11 and the pallet 20).

After step S201, the process of step S106 is performed similarly to the first embodiment.

Subsequently, after the process of step S106, the process of step S202 is performed. That is, the travel route correction unit 1005 of the forklift apparatus 10 corrects the travel route R1 set in advance from the picking-up position A of the pallet 20 to the stacking position B of the pallet 20 to offset the stacking error occurring due to the second positional error $\delta_p"$ and the second angle error $\theta"$ when the pallet 20 is stacked (step S202).

The processes of steps S108 and S109 are performed subsequently as in the first embodiment to complete the process of the flow illustrated in FIG. 14.

As described above, the process content in which the forklift apparatus 10 faces the pallet 20 before the pallet 20 is picked up for unloading, and then picks up the pallet 20, travels, and performs the stacking has been described. A timing at which the pallet 20 is picked up in the process content and, timings of the various detections and timings of the predictions may be parallel, before, or after each other. In particular, the timings of steps S201, S106, and S202 may be any time after the prediction of the first positional error $\delta_p'$, the first angle error $\theta'$, and the centroid position $\delta_g'$ after picking-up and thus may be prior to step S105 in which the pallet 20 is picked up.

(Operations and Advantageous Effects)

The forklift apparatus 10 according to the second embodiment includes: the post-travel error prediction unit 1007 configured to predict the second positional error $\delta_p"$ which is a positional error after the traveling between the standard position M of the fork 11 and the central position O of the pallet 20 on the fork 11 after the forklift apparatus 10 has traveled and the second angle error $\theta"$ which is an angle error after the traveling with respect to the fork 11 in the pallet 20; the travel route correction unit 1005 configured to correct the travel route R1 from the picking-up position A of the pallet 20 to the stacking position B of the pallet 20 to offset the second positional error $\delta_p"$ and the second angle error $\theta"$ when the pallet 20 is stacked; and the conveyance travel control unit 1006 configured to perform travel control such that the pallet 20 is conveyed along the corrected travel route R1'.

Thus, since separate operations such as side shifting of the fork and interval adjustment of the fork are not necessary in the process of correcting the error (the stacking error) occurring when the forklift apparatus 10 picks up and then stack the load 22, a cycle time of work of the forklift apparatus can be shortened, and thus conveyance of the load by the forklift apparatus can be quickly performed.

Further, since the process of correcting the stacking error can be performed through only the correction of the travel route without providing, for example, separate devices such as a side shifting mechanism of the fork and a fork interval adjustment mechanism of the fork, the process of correcting the error can be performed easily at low cost.

Regarding the position of the pallet 20 on the fork 11, an error occurs not only during an operation of picking up the pallet 20 but also during traveling. According to the second embodiment, since the error from the picking-up of the pallet 20 to the stacking of the pallet 20 can be offset, the error at the stacking position B can be offset further than in the first embodiment in which only the error occurring in the picking-up of the pallet 20 is offset. When a complete unmanned operation of distribution in a warehouse is spread in future, high-speed travel and high-speed unloading work of an unmanned forklift are required. Thus, a dynamic action of the pallet on the fork become large and an error during traveling increases. Even in this case, in the forklift apparatus 10 according to the second embodiment, it is possible to effectively offset the stacking error.

(Modification Examples of Second Embodiment)

The forklift apparatus 10 according to the second embodiment has been described in detail above. However, a specific aspect of the forklift apparatus 10 is not limited to the above description and various design modifications can be made within the scope of the present disclosure without departing from the gist of the present disclosure.

(First Modification Example of Second Embodiment)

For example, in the forklift apparatus 10 according to the second embodiment, in step S201 of FIG. 14, the post-travel error prediction unit 1007 predicts the second positional error $\delta_p"$ and the second angle error $\theta"$ which occur from the picking-up position A to the stacking position B based on the first positional error $\delta_p'$ the first angle error $\theta'$, the centroid position $\delta_g'$ after picking-up, as described above.

Here, as a first modification example of the second embodiment, the post-travel error prediction unit 1007 may predict the second positional error $\delta_p"$ and the second angle error $\theta"$ without using the centroid position $\delta_g'$ after picking-up.

Specifically, the post-travel error prediction unit 1007 may predict the second positional error $\delta_p"$ and the second angle error $\theta"$ by applying the first positional error $\delta_p'$, the first angle error $\theta'$, the travel route R1, the travel speed, the tilt amount, the weight of the load 22, and the frictional coefficient between the fork 11 and the pallet 20 to a deviation amount prediction model.

In addition, the post-travel error prediction unit 1007 may predict the second positional error $\delta_p"$ and the second angle error $\theta"$ by using a deviation amount prediction model without using at least any one of the travel route R1, the travel speed, the tilt amount, the weight of the load 22, and the frictional coefficient between the fork 11 and the pallet 20.

By doing so, even the centroid position $\delta_g$ of the load 22 is not detected and the centroid position $\delta_g'$ after picking-up is not predicted, the post-travel error prediction unit 1007 can predict the second positional error $\delta_p"$ and the second angle error $\theta"$. In addition, it is possible to reduce a time taken to predict the second positional error $\delta_p"$ and the second angle error $\theta"$ by not using the centroid position $\delta_g'$ after picking-up for the prediction. The first modification example of the second embodiment is effective in a case in which there is no variation in the centroid position of the load 22 on the pallet 20, or the like.

Third Embodiment

Hereinafter, the forklift apparatus 10 according to a third embodiment will be described with reference to FIG. 15.

(Functional Configuration of Forklift Apparatus)

A functional configuration of the forklift apparatus 10 according to the third embodiment is configured to function similarly to each constituent element of the forklift apparatus 10 according to the first or second embodiment unless otherwise stated.

The travel route setting unit 1004 further sets a travel route from a current position of the forklift apparatus 10 to the picking-up position A of the pallet 20 before the forklift apparatus 10 picks up the pallet 20.

The travel route correction unit 1005 further corrects the travel route until the picking-up of the pallet so that the first positional error $\delta_p'$ and the first angle error $\theta'$ are further reduced when the pallet 20 is picked up. The error prediction unit 1003 further again predicts the first positional error $\delta_p'$ and the first angle error $\theta'$ occurring at the time of the picking-up of the pallet 20 along the corrected travel route.

The conveyance travel control unit 1006 further picks up the pallet 20 along the corrected travel route until the picking-up of the pallet 20.

(Process Flow of Forklift Apparatus 10)

Figure 15:
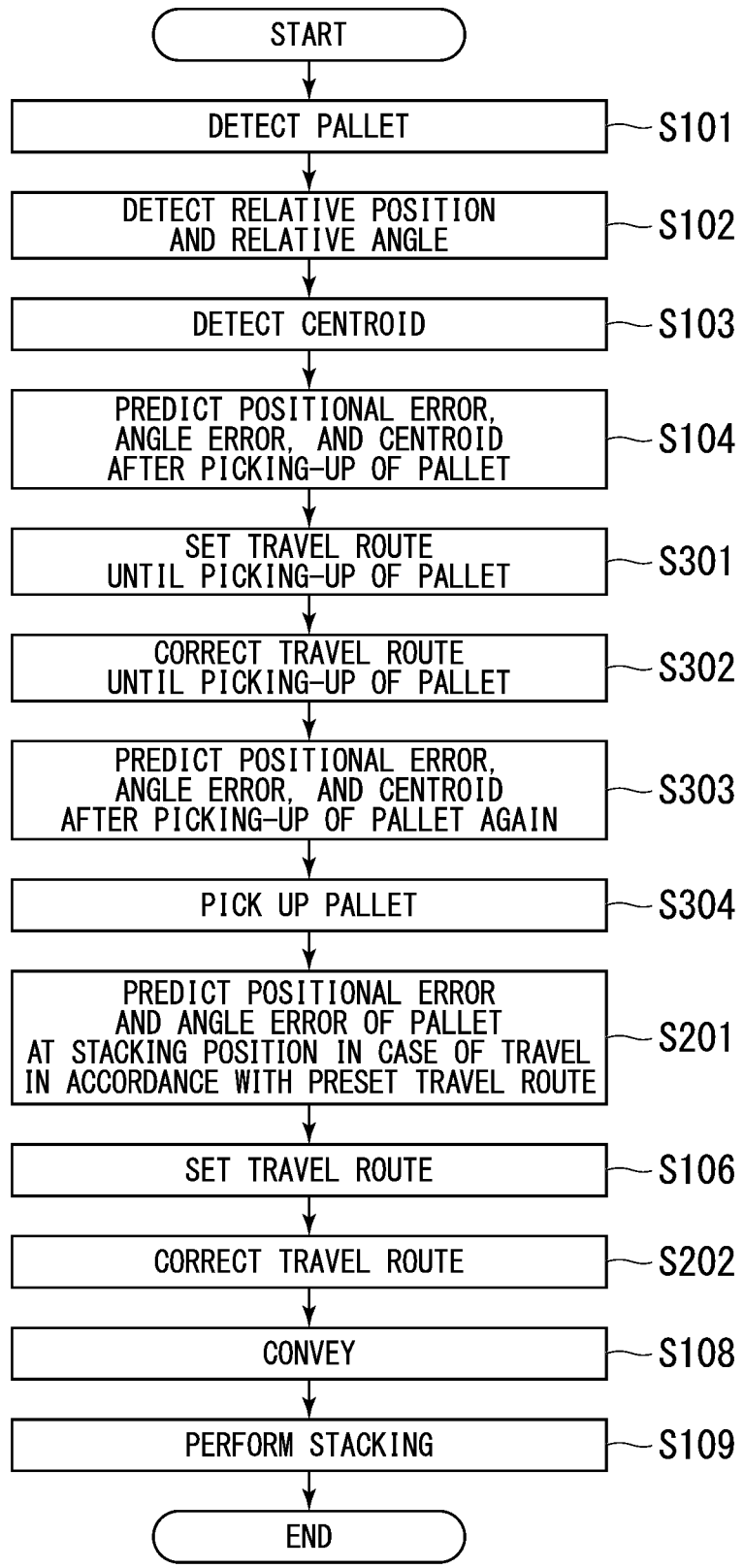
FIG. 15 is an explanatory diagram illustrating a process flow of the forklift apparatus according to a third embodiment.

FIG. 15 is an explanatory diagram illustrating a process flow of the forklift apparatus 10 according to a third embodiment.

The process flow of the forklift apparatus 10 according to the third embodiment illustrated in FIG. 15 is different from the process flow of the forklift apparatus 10 according to the first embodiment illustrated in FIG. 9 or the process flow of the forklift apparatus 10 according to the second embodiment illustrated in FIG. 14 in that steps S301 to S304 are further added. In the forklift apparatus 10 according to the third embodiment, processes other than steps S301 to S304 are similar to the processes of the forklift apparatus 10 according to the first or second embodiment. Thus, different processes will be described below.

As illustrated in FIG. 15, first, processes of steps S101 to S104 are performed similarly to the first embodiment.

Subsequently, after the process of step S104, the process of step S301 is performed. That is, the travel route setting unit 1004 sets the travel route from the current position of the forklift apparatus 10 to the picking-up position A of the pallet 20 before the forklift apparatus 10 picks up the pallet 20 (step S301).

Subsequently, the travel route correction unit 1005 corrects the travel route until the picking-up of the pallet so that the first positional error $\delta_p'$ and the first angle error $\theta'$ are further reduced at the time of the picking-up of the pallet 20 predicted in step S104 (step S302). The error prediction unit 1003 again predicts the first positional error $\delta_p'$ which is a positional error, the first angle error $\theta'$ which is an angle error after picking-up, and the centroid position $\delta_g'$ after picking-up, which occur when the pallet 20 is picked up along the corrected travel route (step S303).

Subsequently, the conveyance travel control unit 1006 picks up the pallet 20 along the corrected travel route until the picking-up of the pallet 20 (step S304).

The processes of steps S201, S106, S202, S108, and S109 are performed subsequently as in the first or second embodiment to complete the process of the flow illustrated in FIG. 15.

As described above, the process content in which the forklift apparatus 10 faces the pallet 20 before the pallet 20 is picked up for unloading, and then picks up the pallet 20, travels, and performs the stacking has been described. A timing at which the pallet 20 is picked up in the process content, timings of the various detections and timings of the predictions may be parallel, before, or after each other. In particular, the timings of steps S201, S106, and S202 may be any time after step S303 in which the first positional error $\delta_p'$, the first angle error $\theta'$, and the centroid position $\delta_g'$ after picking-up are predicted again and thus may be prior to step S304 in which the pallet 20 is picked up.

(Operations and Advantageous Effects)

In the forklift apparatus 10 according to the third embodiment, the travel route correction unit 1005 corrects the travel route until the picking-up of the pallet so that the first positional error $\delta_p'$ and the first angle error $\theta'$ are further reduced when the pallet 20 is picked up. The error prediction unit 1003 further again predicts the first positional error $\delta_p'$ which is a positional error and the first angle error $\theta'$ which is an angle error after picking-up, which occur at the time of the picking-up of the pallet 20 along the corrected travel route. The conveyance travel control unit 1006 further picks up the pallet 20 along the corrected travel route until the picking-up of the pallet 20.

Thus, since the travel route is corrected before the forklift apparatus 10 picks up the pallet 20, the first positional error $\delta_p'$ and the first angle error $\theta'$ can be further reduced. As the advantageous effect obtained accordingly, the forklift apparatus 10 can load the pallet 20 at a safer position on the fork 11 and convey the pallet 20 safely.

(Modification Examples of Third Embodiment)

The forklift apparatus 10 according to the third embodiment has been described in detail above. However, a specific aspect of the forklift apparatus 10 is not limited to the above description and various design modifications can be made within the scope of the present disclosure without departing from the gist of the present disclosure.

First Modification Example of Third Embodiment

For example, in the forklift apparatus 10 according to the third embodiment, in step S303 of FIG. 15, the error prediction unit 1003 again predicts the first positional error $\delta_p'$, the first angle error $\theta'$, and the centroid position $\delta_g'$ after picking-up which occur at the time of the picking-up of the pallet 20 along the corrected travel route, as described above.

Here, as a first modification example of the third embodiment, the error prediction unit 1003 may again predict only the first positional error $\delta_p'$ and the first angle error $\theta'$ which occur at the time of the picking-up of the pallet 20 along the corrected travel route without again predicting the centroid position $\delta_g'$ after picking-up. Specifically, as described in the first modification example of the first embodiment, based on the detected relative position $\delta_p$ before picking-up, the detected relative angle $\theta$ before picking-up, and the error information 1041 defined in advance, the error prediction unit 1003 predicts the first positional error $\delta_p'$ which is a positional error after picking-up between the standard position M of the fork 11 and the central position O of the pallet 20 on the fork 11 after the pallet 20 is picked up for unloading and the first angle error $\theta'$ which is an angle error after the picking-up of the pallet 20 with respect to the fork 11. Here, the error information 1041 is information in which the relative position $\delta_p$ before picking-up and the relative angle $\theta$ before picking-up are associated with the first positional error $\delta_p'$ and the first angle error $\theta'$. Accordingly, based on the detected relative position $\delta_p$ before picking-up and the detected relative angle $\theta$ before picking-up, the error prediction unit 1003 can predict the first positional error $\delta_p'$ and the first angle error $\theta'$ in real time without physical analysis. Subsequently, before the forklift apparatus 10 picks up the pallet 20, the travel route setting unit 1004 sets the travel route from the current position of the forklift apparatus 10 to the picking-up position A of the pallet 20. Subsequently, the travel route correction unit 1005 corrects the travel route until the picking-up of the pallet so that the first positional error $\delta_p'$ and the first angle error $\theta'$ are further reduced at the time of the picking-up of the pallet 20 predicted in step S104. The error prediction unit 1003 again predicts the first positional error $\delta_p'$ and the first angle error $\theta'$ which occur when the pallet 20 is picked up along the corrected travel route without again predicting the centroid position $\delta_g'$ after picking-up.

By doing so, even when the centroid position $\delta_g$ of the load 22 is not detected, the error prediction unit 1003 can predict the first positional error $\delta_p'$ and the first angle error θ'. The first modification example of the third embodiment is effective in a case in which there is no variation in the centroid position of the load 22 on the pallet 20, or the like.

As described above, several embodiments of the present disclosure have been described, but all the embodiments are suggested as examples and are not intended to limit the scope of the present disclosure. The embodiments can be realized in various other forms and various omissions, substitutions, and modifications can be made without departing from the gist of the present disclosure. The embodiments and the modifications are included in the present disclosure described in the claims and the equivalent scope as long as the embodiments and the modifications are included in the scope or the gist of the present disclosure.

The procedure of each process in the CPU 100 described above is stored in a computer-readable recording medium in the format of a program and the foregoing processes are performed when the CPU 100 reads and executes the program. Here, the computer-readable recording medium is a magnetic disk, a magneto-optical disc, a CD-ROM, a DVD-ROM, a semiconductor memory, or the like. The computer program may be delivered to a computer via a communication line and the computer (the CPU 100) to which the computer program is delivered may execute the program.

The program may be configured to realize some of the above-described functions. Further, the program may also be a program in which the above-described functions can be realized in combination with a program which has already been recorded in a computer system, a so-called a differential file (differential program). The computer (the CPU 100) may be configured with one computer or may be configured with a plurality of computers connected in a communicable manner.

According to a second aspect of the present disclosure, the forklift apparatus may further include a relative position angle detection unit configured to detect a relative position before picking-up between the standard position of the fork and a central position of the pallet before the pallet is picked up and a relative angle before picking-up with respect to the fork of the pallet. The error prediction unit may predict the first positional error and the first angle error based on the relative position before picking-up and the relative angle before picking-up.

According to a third aspect of the present disclosure, the forklift apparatus may further include a storage unit configured to store error information in which the relative position before picking-up and the relative angle before picking-up are associated with the first positional error and the first angle error. The error prediction unit may predict the first positional error and the first angle error based on the error information.

According to a fourth aspect of the present disclosure, the forklift apparatus may further include a centroid position detection unit configured to detect a centroid position before picking-up in a load on the pallet before the pallet is picked up. Based on the centroid position before picking-up and the error information, the error prediction unit may predict the first positional error, the first angle error, and a centroid position after picking-up in the load on the pallet after the pallet is picked up. The error information may further include the centroid position before picking-up and the centroid position after picking-up, and the relative position before picking-up, the relative angle before picking-up, and the centroid position before picking-up are stored in association with the first positional error, the first angle error, and the centroid position after the picking-up for storage.

According to a fifth aspect of the present disclosure, further based on the relative position before picking-up and the relative angle before picking-up, the travel route correction unit may correct a travel route until the picking up of the pallet so that the first positional error and the first angle error are further reduced. Furthermore, the conveyance travel control unit may cause the pallet to be picked up along the corrected travel route until the picking-up of the pallet.

According to a sixth aspect of the present disclosure, the error prediction unit may further include a post-travel error prediction unit that predicts a second positional error which is a positional error after travel and a second angle error which is an angle error after the travel, which occur from the picking-up position to the stacking position based on the first positional error and the first angle error. The travel route correction unit may further correct the travel route from the picking-up position to the stacking position to offset the second positional error and the second angle error when the pallet is stacked.

According to a seventh aspect of the present disclosure, there is provided a forklift control method including: predicting a first positional error which is a positional error after picking-up between a standard position of a fork and a central position of a pallet on the fork after the pallet is picked up and a first angle error which is an angle error after picking-up with respect to the fork in the pallet; correcting a travel route from a picking-up position of the pallet to a stacking position of the pallet to offset the first positional error and the first angle error when the pallet is stacked; and performing travel control such that the pallet is conveyed along the corrected travel route.

According to an eighth aspect of the present disclosure, there is provided a non-transitory computer-readable medium that stores a program causing a computer of a forklift apparatus traveling along a travel route to perform: predicting a first positional error which is a positional error after picking-up between a standard position of a fork and a central position of a pallet on the fork after the pallet is picked up and a first angle error which is an angle error after picking-up with respect to the fork in the pallet; correcting the travel route from a picking-up position of the pallet to a stacking position of the pallet to offset the first positional error and the first angle error when the pallet is stacked; and performing travel control such that the pallet is conveyed along the corrected travel route.

Additionally, constituent elements in the foregoing embodiments can be appropriately substituted with known constituent elements within the scope of the present disclosure without departing from the gist of the present disclosure. In addition, the technical scope of the present disclosure is not limited to the foregoing embodiments and various modifications can be made within the scope of the present disclosure without departing from the gist of the present disclosure.

REFERENCE SIGNS LIST

10 Forklift apparatus
11 Fork
20 Pallet
21 Hole
22 Load
100 CPU
1001 Relative position angle detection unit
1002 Centroid position detection unit
1003 Error prediction unit
1004 Travel route setting unit 1005 Travel route correction unit
1006 Conveyance travel control unit
1007 Post-travel error prediction unit
101 Fork motor
102 Travel motor
103 Camera
104 Storage unit
1041 Error information
1042 Travel route information

The invention claimed is:

1. A forklift apparatus comprising:
an error prediction unit configured to predict a first positional error which is a positional error after picking-up between a standard position of a fork and a central position of a pallet on the fork after the pallet is picked up and a first angle error which is an angle error after picking-up with respect to the fork in the pallet;
a travel route correction unit configured to correct a travel route from a picking-up position of the pallet to a stacking position of the pallet to offset the first positional error and the first angle error when the pallet is stacked; and
a conveyance travel control unit configured to perform travel control such that the pallet is conveyed along the corrected travel route.

2. The forklift apparatus according to claim 1, further comprising:
a relative position angle detection unit configured to detect a relative position before picking-up between the standard position of the fork and the central position of the pallet before the pallet is picked up and a relative angle before picking-up with respect to the fork of the pallet,
wherein the error prediction unit is configured to predict the first positional error and the first angle error based on the relative position before picking-up and the relative angle before picking-up.

3. The forklift apparatus according to claim 2, further comprising:
a storage unit configured to store error information in which the relative position before picking-up and the relative angle before picking-up are associated with the first positional error and the first angle error,
wherein the error prediction unit is configured to predict the first positional error and the first angle error based on the error information.

4. The forklift apparatus according to claim 3, further comprising:
a centroid position detection unit configured to detect a centroid position before picking-up in a load on the pallet before the pallet is picked up,
wherein, based on the centroid position before picking-up and the error information, the error prediction unit is configured to predict the first positional error, the first angle error, and a centroid position after picking-up in the load on the pallet after the pallet is picked up, and
wherein the error information further includes the centroid position before picking-up and the centroid position after picking-up, and the relative position before picking-up, the relative angle before picking-up, and the centroid position before picking-up are stored in association with the first positional error, the first angle error, and the centroid position after picking-up.

5. The forklift apparatus according to claim 2,
wherein, further based on the relative position before picking-up and the relative angle before picking-up, the travel route correction unit is configured to correct a travel route until the picking up of the pallet so that the first positional error and the first angle error are further reduced, and
wherein furthermore, the conveyance travel control unit is configured to cause the pallet to be picked up along the corrected travel route until the picking-up of the pallet.

6. The forklift apparatus according to claim 1,
wherein the error prediction unit further includes a post-travel error prediction unit that is configured to predict a second positional error which is a positional error after travel and a second angle error which is an angle error after the travel, which occur from the picking-up position to the stacking position based on the first positional error and the first angle error, and
wherein the travel route correction unit is further configured to correct the travel route from the picking-up position to the stacking position to offset the second positional error and the second angle error when the pallet is stacked.

7. A forklift control method comprising:
predicting a first positional error which is a positional error after picking-up between a standard position of a fork and a central position of a pallet on the fork after the pallet is picked up and a first angle error which is an angle error after picking-up with respect to the fork in the pallet;
correcting a travel route from a picking-up position of the pallet to a stacking position of the pallet to offset the first positional error and the first angle error when the pallet is stacked; and
performing travel control such that the pallet is conveyed along the corrected travel route.

8. A non-transitory computer-readable medium that stores a program causing a computer of a forklift apparatus traveling along a travel route to perform:
predicting a first positional error which is a positional error after picking-up between a standard position of a fork and a central position of a pallet on the fork after the pallet is picked up and a first angle error which is an angle error after picking-up with respect to the fork in the pallet;
correcting the travel route from a picking-up position of the pallet to a stacking position of the pallet to offset the first positional error and the first angle error when the pallet is stacked; and
performing travel control such that the pallet is conveyed along the corrected travel route.

* * * * *